US008793664B2

(12) United States Patent
Joshi et al.

(10) Patent No.: US 8,793,664 B2
(45) Date of Patent: Jul. 29, 2014

(54) REDUCING FALSE ALARMS FOR STATIC ANALYSIS OF CONCURRENT PROGRAMS

(75) Inventors: Saurabh Joshi, Kanpur (IN); Shuvendu K. Lahiri, Redmond, WA (US); Akash Lal, Bangalore (IN)

(73) Assignee: Microsoft Corporation, Redmond, WA (US)

(*) Notice: Subject to any disclaimer, the term of this patent is extended or adjusted under 35 U.S.C. 154(b) by 401 days.

(21) Appl. No.: 13/316,563

(22) Filed: Dec. 12, 2011

(65) Prior Publication Data

US 2013/0152055 A1 Jun. 13, 2013

(51) Int. Cl.
*G06F 9/44* (2006.01)
(52) U.S. Cl.
USPC .......................................................... 717/131
(58) Field of Classification Search
CPC ................................ G06F 9/44; G06F 21/563
USPC .......................................................... 717/131
See application file for complete search history.

(56) References Cited

U.S. PATENT DOCUMENTS

2009/0125887 A1   5/2009   Kahlon et al.
2012/0151449 A1*  6/2012   Maeda et al. ................. 717/126

OTHER PUBLICATIONS

Musuvathi, et al., "Finding and Reproducing Heisenbugs in Concurrent Programs", Retrieved at <<http://www.usenix.org/event/osdi08/tech/full_papers/musuvathi/musuvathi.pdf>>, Proceedings of the 8th USENIX symposium on Operating systems design and implementation (OSDI), 2008, pp. 267-280.

Kahlon, et al., "Fast and Accurate Static Data-Race Detection for Concurrent Programs", Retrieved at <<http://www.cs.utexas.edu/~kahlon/papers/cav07.pdf>>, Proceedings of the 19th international conference on Computer aided verification (CAV), 2007, pp. 1-14.

Vakilian, et al., "Keshmesh: A Tool for Detecting and Fixing Java Concurrency Bug Patterns", Retrieved at <<https://www.ideals.illinois.edu/bitstream/handle/2142/25976/2011-splash-keshmesh-demo.pdf?sequence=2>>, Proceedings of the ACM international conference companion on Object oriented programming systems languages and applications companion (SPLASH Companion), Oct. 22-27, 2011, pp. 2.

Naik, et al., "Effective Static Race Detection for Java", Retrieved at <<http://citeseerx.ist.psu.edu/viewdoc/download?doi=10.1.1.65.7150&rep=rep1&type=pdf>>, ACM SIGPLAN conference on Programming language design and implementation (PLDI), Jun. 11-14, 2006, pp. 308-319.

Ayewah, et al., "Experiences Using Static Analysis to Find Bugs", Retrieved at <<http://static.googleusercontent.com/external_content/untrusted_dlcp/research.google.com/en//pubs/archive/34339.pdf>>, IEEE Software, vol. 25, 2008, pp. 1-9.

Alur, et al., "Synthesis of Interface Specifications for Java Classes", Retrieved at <<http://www.personal.psu.edu/users/w/u/wun1/pubs/POPL05.pdf>>, Proceedings of the 32nd ACM SIGPLAN-SIGACT symposium on Principles of programming languages (POPL), Jan. 12-14, 2005, pp. 98-109.

(Continued)

*Primary Examiner* — John Chavis
(74) *Attorney, Agent, or Firm* — Steve Wight; Brian Haslam; Micky Minhas

(57) ABSTRACT

The claimed subject matter provides a method for performing a static analysis of concurrent programs. The method includes determining that a static analysis of the first concurrent program generates a warning for an input. The method also includes determining whether a static analysis of the second concurrent program generates the warning for the input. The method further includes removing the warning if the static analysis of the second concurrent program generates the warning.

20 Claims, 5 Drawing Sheets

(56) References Cited

OTHER PUBLICATIONS

Barnett, et al., "Weakest-precondition of Unstructured Programs", Retrieved at <<http://research.microsoft.com/en-us/um/people/qadeer/cse599f/papers/krml157.pdf>>, Proceedings of the 6th ACM SIGPLAN-SIGSOFT workshop on Program analysis for software tools and engineering (PASTE), 2005, pp. 1-7.

Barman, et al., "Programming with Angelic Nondeterminism", Retrieved at <<http://parlab.eecs.berkeley.edu/sites/all/parlab/files/angelic-acm-dl.pdf>>, Proceedings of the 37th annual ACM SIGPLAN-SIGACT symposium on Principles of programming languages (POPL), Jan. 17-23, 2010, pp. 339-351.

Borger, et al., "The Classical Decision Problem", Retrieved at <<http://www.di.unipi.it/~boerger/decpblbookintro.ps>>, Retrieved at <<http://www.di.unipi.it/~boerger/decpblbookintro.ps>>, Perspectives in Mathematical Logic, Springer Verlag, 1997, pp. 14.

Burckhardt, et al., "Line-up: A Complete and Automatic Linearizability Checker", Retrieved at <<http://research.microsoft.com/en-us/projects/chess/pldi015-burckhardt.pdf>>, ACM SIGPLAN conference on Programming language design and implementation (PLDI), Jun. 5-10, 2010, pp. 330-340.

Burnim, et al., "NDSeq: Runtime Checking for Nondeterministic Sequential Specifications of Parallel Correctness", Retrieved at <<http://srl.cs.berkeley.edu/~ksen/papers/ndseq-lang.pdf>>, Proceedings of the 32nd ACM SIGPLAN conference on Programming language design and implementation (PLDI), Jun. 4-8, 2011, pp. 401-414.

Cordeiro, et al., "Verifying Multi-threaded Software using SMT-based Context-bounded Model Checking", Retrieved at <<http://eprints.ecs.soton.ac.uk/22050/1/icse11-cordeiro.pdf>>, Proceeding of the 33rd International Conference on Software Engineering (ICSE), May 21-28, 2011, pp. 331-340.

Detlefs, et al., "Simplify: A Theorem Prover for Program Checking", Retrieved at <<http://www.intercom.virginia.edu/~weimer/2006-615/reading/detlefs-simplify.pdf>>, Journal of the ACM, vol. 52, No. 3, May 2005, pp. 365-473.

Dijkstra, et al., "Guarded Commands, Nondeterminacy and Formal Derivation of Programs", Retrieved at <<http://www.win.tue.nl/~mvdbrand/courses/seminar/0809/papers/Dijkstra_Guarded_Commands_nondeterminacy_etc.pdf>>, Communications of the ACM, vol. 18, No. 8, Aug. 1975, pp. 453-457.

Dillig, et al., "Static Error Detection using Semantic Inconsistency Inference", Retrieved at <<http://theory.stanford.edu/~aiken/publications/papers/pldi07a.pdf>>,ACM SIGPLAN conference on Programming language design and implementation (PLDI), Jun. 11-13, 2007, pp. 435-445.

Emmi, et al., "Delay-bounded Scheduling", Retrieved at <<http://research.microsoft.com/pubs/141925/popl198ap-emmi.pdf>>, Proceedings of the 38th annual ACM SIGPLAN-SIGACT symposium on Principles of programming languages, Jan. 26-28, 2011, pp. 411-422.

Herlihy, et al., "Linearizability: A Correctness Condition for Concurrent Objects", Retrieved at <<http://www.cs.cornell.edu/andru/cs711/2002fa/reading/linearizability.pdf>>, ACM Transactions on Programming Languages and Systems (TOPLAS), vol. 12, No. 3, Jul. 1990, pp. 463-492.

Jhala, et al., "Interprocedural Analysis of Asynchronous Programs", Retrieved at <<http://202.120.38.217/~yuehg/POPL/Interprocedural%20analysis%20of%20asynchronous%20programs%20(2007).pdf>>, Proceedings of the 34th annual ACM SIGPLAN-SIGACT symposium on Principles of programming languages, Jan. 17-19, 2007, pp. 339-350.

Kremenek, et al., "Z-ranking: Using Statistical Analysis to Counter the Impact of Static Analysis Approximations", Retrieved at <<http://citeseerx.ist.psu.edu/viewdoc/download?doi=10.1.1.63.9430&rep=rep1&type=pdf>>, Proceedings of the 10th international conference on Static analysis (SAS), LNCS 2694, 2003, pp. 295-315.

Lahiri, et al., "Static and Precise Detection of Concurrency Errors in Systems Code using SMT Solvers", Retrieved at <<http://research.microsoft.com/pubs/80360/paper_170.pdf>>, Proceedings of the 21st International Conference on Computer Aided Verification (CAV), 2009, pp. 15.

Leino, et al., "Generating Error Traces from Verication-condition Counterexamples", Retrieved at <<http://www.cs.ucla.edu/~todd/research/scp05.pdf>>, Science of Computer Programming, vol. 55, No. 1-3, 2005, pp. 209-226.

"Poirot: The Concurrency Sleuth", Retrieved at <<http://research.microsoft.com/en-us/projects/poirot/>>, Retrieved Date: Sep. 20, 2011, pp. 2.

Sen, et al., "Model Checking Multithreaded Programs with Asynchronous Atomic Methods", Retrieved at <<http://osl.cs.uiuc.edu/docs/cav062/multiset-tr.pdf>>, In Computer Aided Verication, 2006, pp. 1-15.

Siegel, et al., "Using Model Checking with Symbolic Execution to Verify Parallel Numerical Programs", Retrieved at <<http://ext.math.umass.edu/~avrunin/papers/siegel06-using_model_checking_symbolic_execution.pdf>>,International Symposium on Software Testing and Analysis (ISSTA), Jan. 17-20, 2006, pp. 157-168.

Tkachuk, et al., "Automated Environment Generation for Software Model Checking", Retrieved at <<http://citeseerx.ist.psu.edu/viewdoc/download?doi=10.1.1.60.1681&rep=rep1&type=pdf>>, Proceedings of the 18th IEEE International Conference on Automated Software Engineering (ASE), 2003, pp. 1-12.

Voung, et al., "Relay: Static Race Detection on Millions of Lines of Code", Retrieved at <<http://www.cs.umich.edu/~bchandra/courses/papers/Voung_Relay.pdf>>, Proceedings of the the 6th joint meeting of the European software engineering conference and the ACM SIGSOFT symposium on The foundations of software engineering (ESEC/SIGSOFT FSE), Sep. 3-7, 2007, pp. 205-214.

"About the Windows Driver Kit (WDK)", Retrieved at <<http://www.microsoft.com/whdc/devtools/ddk/default.mspx>>, Sep. 20, 2011, pp. 2.

* cited by examiner

300

REDUCING FALSE ALARMS FOR STATIC ANALYSIS OF CONCURRENT PROGRAMS

BACKGROUND

Static analysis is an approach to testing computer software that uses automation to reduce costs of traditional testing processes. Typically, a testing process involves running executable code, measuring results, etc. However, in static analysis, bugs are detected in source code without actually having a computer processor execute the code. Instead, a static analysis checker analyzes the code to find bugs, or to prove their absence. Static analysis checkers generate warnings to mark the potential bugs. In some approaches, the user provides a test harness that "invokes" the programs to be analyzed. The test harness is a piece of code that sets up required preconditions for the program and exercises a particular test scenario. Because the source code is not actually executed, "invoking" a program involves a simulated execution by the static analysis checker.

However, the test harness may lead to false alarms in the static analysis itself. One reason for this difficulty is that many programs have undocumented preconditions that an underspecified test harness may not specify. For instance, before invoking a read operation on a file, the program may assume the file is opened. Unless this precondition is satisfied by the test harness, the read operation may fail, causing the static analysis checker to generate a warning. However, reporting this warning to the user may hinder the testing process because the warning results from an incompleteness in the test harness, not a bug in the source code. These types of warnings are referred to herein as false alarms, or spurious warnings. The user may waste valuable resources attempting to fix false alarms, which are also a hindrance to further adoption of static analysis tools, specifically those for checking user-defined assertions in programs.

It is noted that false alarms are more broad than just the ones that happen due to underspecified harness. A false alarm is an alarm that does not correspond to a bug during the actual executions of a program. The lack of a fully specified harness is one source of false alarms for static analysis.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The claimed subject matter provides a method for performing a static analysis of concurrent programs. The method includes determining that a static analysis of the first concurrent program generates a warning for an input. The method also includes determining whether a static analysis of the second concurrent program generates the warning for the input. The method further includes removing the warning if the static analysis of the second concurrent program generates the warning.

The claimed subject matter also provides a system for performing a static analysis of concurrent programs. The system includes a processing unit and a system memory. The system memory includes code configured to direct the processing unit to determine that a static analysis of the first concurrent program generates a warning for an input. The first concurrent program comprises a first non-deterministic program. It is determined whether a static analysis of the second concurrent program generates the warning for the input. The second concurrent program comprises a second non-deterministic program, and is executed sequentially. The warning is removed if the static analysis of the second concurrent program generates the warning.

Additionally, the claimed subject matter includes a computer-readable storage media. The computer-readable storage media includes code configured to direct a processing unit to determine that a static assertion checking of the first concurrent program generates a warning for an input. The first concurrent program comprises a first non-deterministic program. It is determined whether a static assertion checking of the second concurrent program generates the warning for the input. The second concurrent program comprises a second non-deterministic program, and is executed sequentially. The warning is removed if the static analysis of the second concurrent program generates the warning. A deterministic filter is generated for a plurality of inputs to the static assertion checking. The deterministic filter removes a plurality of warnings for the plurality of inputs.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
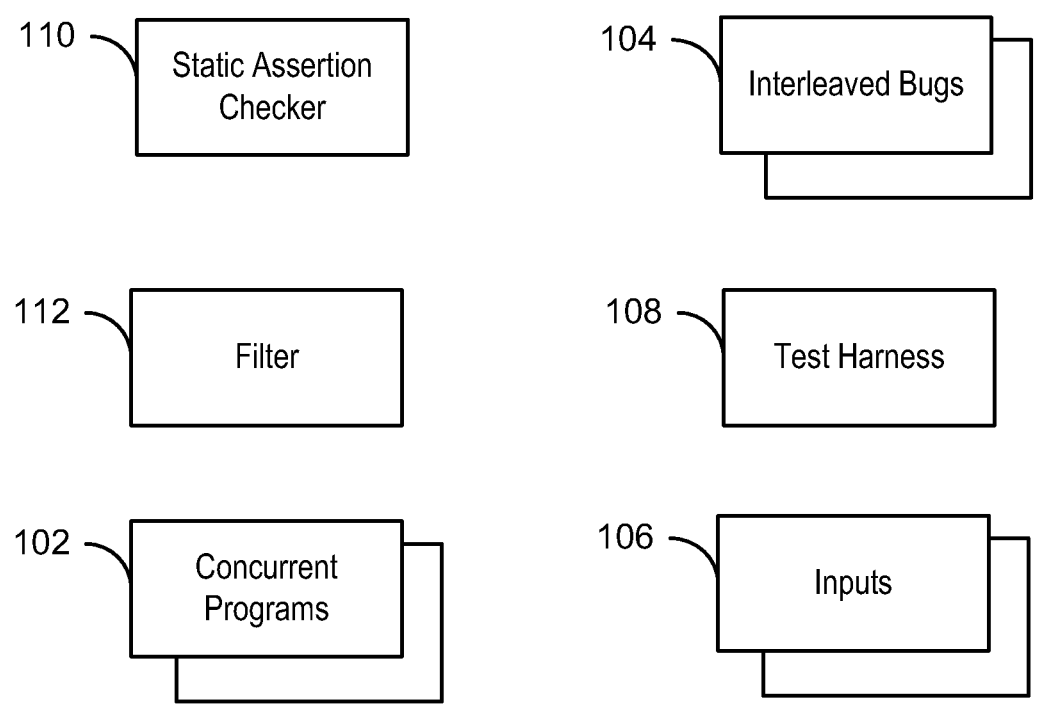
FIG. 1 is a system for static assertion checking, operating in accordance with the claimed subject matter.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, the terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware.

By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any non-transitory computer-readable device, or media.

Non-transitory computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not necessarily storage media) may additionally include communication media such as transmission media for wireless signals and the like.

Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Some warnings from a static analysis checker may result from underspecified harnesses. Accordingly, in one embodiment, a system may automatically filter out or de-prioritize warnings that result from an underspecified harness, i.e., false alarms. In such an embodiment, the number of false alarms reported to the user may be reduced or eliminated. By reducing the false alarms, the system may improve the quality of static analysis checking.

Static assertion checking is an example of a static analysis approach that validates assertions specified in program source code. Software engineers may place assertions in source code as a way of testing certain computer program conditions when debugging. Programs may also include implicit assertions. If an assertion fails during testing, this may indicate a problem in the source code. Accordingly, static assertion checkers provide warnings to a user when assertions fail. In this way, the warnings help the user debug computer programs. It is noted that while the following discussion describes static assertion checking, the system, method, and techniques may be applied to other types of static analysis.

FIG. 1 is a system 100 for static assertion checking, operating in accordance with the claimed subject matter. The system 100 may include concurrent programs 102, interleaved bugs 104, inputs 106, test harnesses 108, a static assertion checker (checker) 110, and a filter 112. A concurrent program 102 consists of a set of threads that can be executed in an interleaved manner. Executing threads in an interleaved manner means that instructions from different threads can interleave in an execution. For example, in one embodiment, the concurrent programs 102 may be open programs in a program library. Open programs are programs that do not have a main procedure. Instead, open programs expose a set of application programming interface (API) methods.

The interleaved bugs 104 are potential bugs that occur inconsistently across the concurrent programs 102 for a given input 106. For example, static assertion checking of a first concurrent program 102 with a specific input 106 and test harness 108 may result in a warning that may indicate a potential bug. A second concurrent program may be a single thread execution of the first concurrent program. If the second concurrent program 102 also generates the warning, the potential bug has happened sequentially. If the second concurrent program does not generate the warning, the potential bug is an interleaved bug 104.

The concurrent programs 102 may be deterministic or non-deterministic. A deterministic program has a fixed result for a given input 106. A non-deterministic program has multiple possible results for a given input. Non-determinism may arise from a number of issues, such as the modeling of external calls, or a thread scheduler. More specifically, non-determinism may arise from data non-determinism or control non-determinism. Data non-determinism refers to the concurrent program 102 making calls to libraries that are modeled non-deterministically. For example, in order to model a method to determine the time of day, a model may be provided that returns a non-deterministically chosen time. Accordingly, the concurrent program 102 inherits these sources of non-determinism. Control non-determinism refers to the concurrent program 102 having some non-determinism in scheduling.

The interleaved bug 104 may be less likely to be a false warning than the sequential bug because sequential bugs may be more likely to result from an underspecified harness. For example, every execution of a single program may assume a file is open. As such, if the test harness 108 does not open the file, all executions fail whenever the file is referenced. Accordingly, for inputs 106 with underspecified harnesses, interleaved bugs 104 do not occur because the failures occur in sequential executions.

In one embodiment, the filter 112 performs a method for prioritizing or reducing false alarms during static analysis of concurrent programs. The method partitions the set of inputs 106 to the concurrent program 102 into two sets: (1) A set of inputs that lead to an alarm, the violation of an assertion, in the static analysis of the sequential executions of the concurrent program, and (2) all other inputs. Then, the method merely reports the alarms that correspond to the second set of inputs. The method works by assuming that the inputs that cause an alarm in the sequential (non-interleaved) executions do not correspond to real bugs, but arise due to the underspecified test harness 108.

The method can be generalized to consider two non-deterministic concurrent programs 102 where the first program acts as a filter for the false alarms for the second program. The method consists of statically analyzing the two programs the two programs, and only reports alarms for the second program for an input that does not result in alarm for the first program. The method works by finding alarms in the second program and then querying the first program with the same input to see if the first program can raise an alarm. This process is repeated until no new alarms are found in the second program.

The method presented can be used with any static analysis method that can produce an input that causes static analysis to raise a false alarm. For clarity, the checker 110 represents static analysis for static assertion checking. The filter 112 may generate warnings for interleaved bugs 104 based on a static analysis of the concurrent programs 102 for the given inputs 106. In one embodiment, the filter 112 may generate warnings for the interleaved bugs 104 by performing a differential analysis of two concurrent programs 102, e.g., $P_1$ and $P_2$. The differential analysis of two programs, $P_1$ and $P_2$, involves finding an input 106, i, such that $P_2$ fails when executed with i, but $P_1$ does not. In this way, $P_2$ is tested against an input 106 only when $P_1$ does not fail on the input 106. For clarity, the differential analysis is represented as DiffError($P_1$,$P_2$).

Let P be a concurrent program 102. Let $P_s$ be the same program, but executions of $P_s$ are executed sequentially. Determining which inputs 106 result in interleaved bugs 104 is performed by solving DiffError($P_s$, P). In one embodiment, various underapproximations of $P_s$ may be selected for the purpose of proving the absence of interleaved bugs 104 for a specific input 106. An underapproximation of $P_s$ refers to another program whose executions are a subset of the executions of $P_s$.

Solving DiffError($P_1$,$P_2$) may be more complex when the concurrent programs 102 are non-deterministic. In the following discussion, a simplified syntax is used for discussing the concurrent programs 102. Further, it is assumed that there is a single global variable, g, of type T. For the purpose of this discussion, the type, T, is not defined. Instead, the presence of certain predicates over T are defined. Additionally, the concurrent programs 102 are described as including a variable, Failed, which is a predicate of type T→Boolean.

Each of the concurrent programs 102 is a list of procedure declarations. Each procedure takes a single variable of type T as input, returns a single variable of type T as output, and has a single statement. A program statement, st, may have the following syntax (in psuedocode):

| SYNTAX 1: | |
|---|---|
| st::=st;st | (Sequence) |
| \|if (e) st else st | (if-then-else) |
| \|while (e) do st | (loop) |
| \|x:=e | (Assignment) |
| \|assume e | (Assume) |
| \|assert e | (Assert) |
| \|x = * | (Non-deterministic assignment) |
| \|call x:=foo(e) | (Procedure call) |
| \|async call foo(e) | (Thread spawn) |

In Syntax 1, e is an expression over variables in a program's scope, using some operators that are left undefined. Similar to the syntax of the C language, the statement, x=* is a non-deterministic assignment to the variable, x. This statement is also referred to herein as the havoc x statement. The assume e statement blocks in a state when e does not hold, and has no effect otherwise. Blocking refers to an execution that does not make any progress. The assert e statement fails in a state when e does not hold, in which case program control jumps to the end of the concurrent program 102 and the global variable, g, is modified such that Failed(g) holds. Otherwise, Failed(g) does not hold. The async call foo(e) statement spawns a new thread that executes procedure foo with argument e.

The havoc x statement induces data non-determinism. Similarly, concurrency (via threads spawned by async statements) induces control non-determinism. For the sake of clarity, references to non-determinism may be to either data or control non-determinism.

At any point in a concurrent program's execution, the concurrent program's state is represented by the values of variables in the concurrent program's scope. In particular, the input and output state of the concurrent program 102 is the value of the global variable, g. Given a concurrent program 102, P, $F_P$ may represent a relation between P's input and output. Specifically, given input state, s, and output state, t, the relation (s,t) ∈ $F_P$ if there is an execution of the concurrent program 102 from input state, s, that ends in output state, t. A concurrent program 102 has a buggy execution on input s if (s,t) ∈ $F_P$ for some t and Failed(t) holds.

To illustrate the differential analysis performed by the filter 112, the problem, DiffError is solved for two concurrent programs 102 that expect the same input, i. For the purpose of discussion, it is assumed that the concurrent programs 102 include assertions that capture a property of interest. The DiffError problem can be formally defined as follows. Given two programs $P_1$ and $P_2$, DiffError($P_1$,$P_2$) holds if there exists an input state s such that: (1) there is some execution of $P_2$ starting at state, s, that violates an assertion, and (2) no execution of $P_1$ on s violates an assertion.

Typically, static assertion checking involves finding a buggy execution of a concurrent program 102 for debugging. However, the filter 112 looks for a buggy execution of $P_2$ while reasoning over all executions of $P_1$. Specifically, given programs $P_1$ and $P_2$, the DiffError problem may be represented as shown in Formula 1.

$$\exists s \exists t (F_{P_2}(s, t) \land \text{Failed}(t) \land \forall t'(F_{P_1}(s,t') \neg \text{Failed}(t'))). \quad \text{FORMULA 1:}$$

In this way, instead of reporting all warnings resulting from static assertion checking of the concurrent programs 102, the filter 112 may merely report the interleaved bugs 104. By limiting the warnings to interleaved bugs 104, spurious warnings may be reduced or eliminated. When the program, $P_1$, is deterministic and terminating, the DiffError problem can be reduced to a standard verification problem, described in greater detail with respect to FIG. 2. Standard verification refers to any tool for finding bugs in a program.

Figure 2:
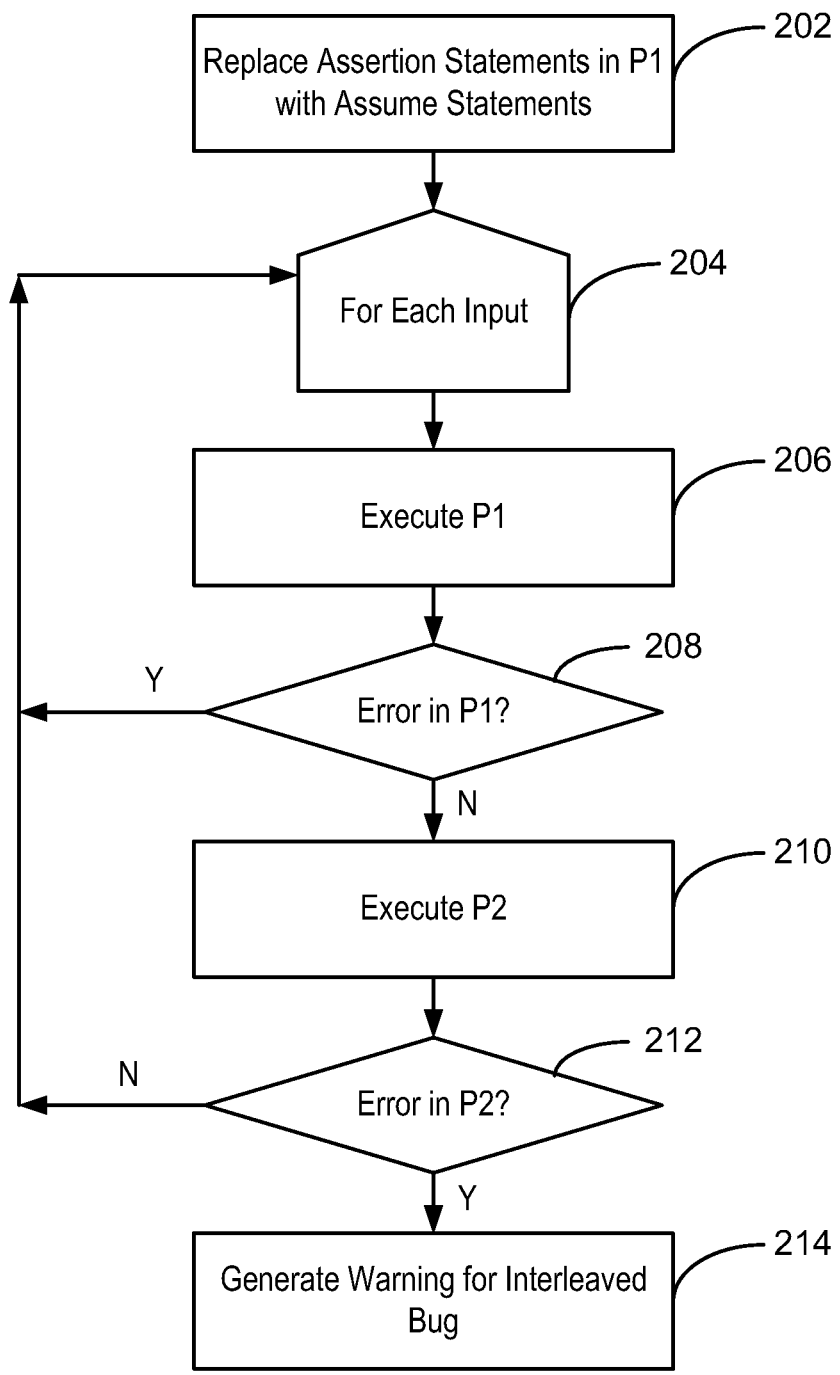
FIG. 2 is a process flow diagram of a method for static assertion checking in accordance with the claimed subject matter.

FIG. 2 is a process flow diagram of a method 200 for static assertion checking in accordance with the claimed subject matter. The method 200 may be performed by the filter 112. It is noted that the process flow diagram is not intended to indicate a particular order of execution. The method 200 begins at block 202, where the filter 112 replaces all assertion statements in program, $P_1$, with assume statements.

Blocks 204-214 may be repeated for each input 106. At block 206, the modified $P_1$, may be executed. At block 208, it may be determined whether an error occurred in the execution of the modified $P_1$. If so, control may flow back to block 204 for the next input.

At block 210, concurrent program, $P_2$, is executed. Because the asserts are replaced by assumes in $P_1$, the modified program $P_1$ blocks on all inputs that cause $P_1$ to fail.

At block 212, it may be determined whether an error occurred in the execution of $P_2$. If not, control may flow back to block 204 for the next input. If an error does not occur, at block 214, the filter 112 may generate a warning for an interleaved bug 104. Because blocked inputs are not used in the execution of $P_2$, the interleaved bugs are limited to inputs 106 that fail on $P_2$, but not $P_1$, which solves DiffError.

Figure 3:
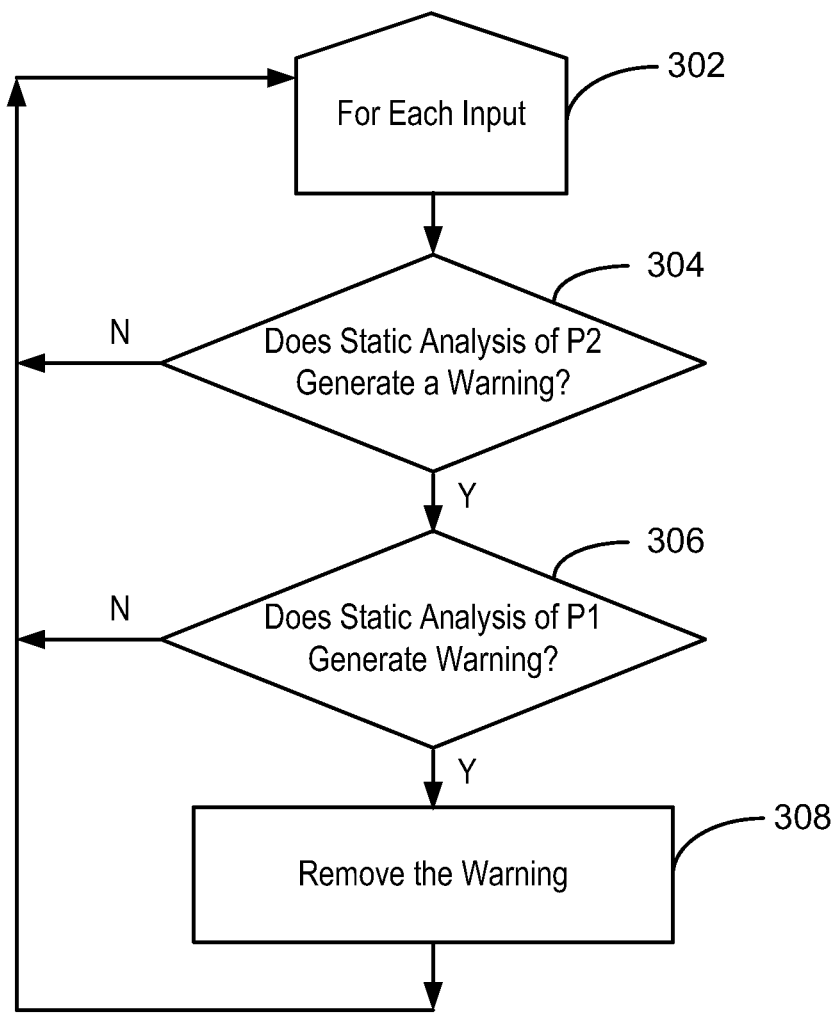
FIG. 3 is a process flow diagram of a method for static assertion checking, in accordance with the claimed subject matter.

FIG. 3 is a process flow diagram of a method 300 for static assertion checking, in accordance with the claimed subject matter. The method 300 may be performed by the filter 112. It is noted that the process flow diagram is not intended to indicate a particular order of execution. The method 300 begins at block 302. Blocks 302-308 repeat for each input 106.

At block 304, the filter 112 may determine whether a static analysis of concurrent program, $P_2$, generates a warning. A warning is generated if the static assertion checking results in an assertion failure for this input 106. In one embodiment, a tool may be used for finding assertion violations in a given program. Given a concurrent program 102 with assertions, this tool returns an indicator as to whether there are assertion violations. In the case that there are assertion violations for this input, the tool may return an execution trace that documents the assertion violation. An execution trace consists of a sequence of program statements in the order of execution. The execution trace may also include the values of variables at each statement in the execution trace.

If there is not an assertion failure in program, $P_2$, the method control flows to block 302. If there is an assertion failure, at block 306 it is determined whether a static analysis of concurrent program, $P_1$, generates a warning. If there is an assertion failure generating a warning, this may indicate an issue with the test harness 108. Accordingly, at block 308, the warning is removed. If there is not an assertion failure for $P_1$, the method control flows to block 302 for the next input.

If there is not an assertion failure in $P_1$, this indicates an interleaved bug 104. Accordingly, the filter 112 does not remove the warning for the interleaved bug 104. In one embodiment, warnings for interleaved bugs 104 may also be generated for other inputs that cause $P_1$ to fail. In such an embodiment, a modification of the trace t itself may be used to create a deterministic filter f that filters out i, as well as, other inputs that cause $P_1$ to fail along the trace t'. The modification includes replacing the havoc x statements with x:=c, where c is the concrete value assigned to x in the trace returned by the tool. Additionally, a predicate transformer takes a trace t and a formula $\psi$ and returns a formula representing the path condition in terms of the inputs to the trace. The predicate transformers may be specified as represented in Equations 1-5:

$$\text{pre}(\text{skip},\psi)=\psi \quad (1)$$

$$\text{pre}(\text{assume},\psi)=\Lambda\psi \quad (2)$$

$$\text{pre}(\text{assert},\psi)=\neg\Lambda\psi \quad (3)$$

$$\text{pre}(x:=e,\psi)=\psi[e/x] \quad (4)$$

$$\text{pre}(s; t, \psi)=\text{pre}(s, \text{pre}(t, \psi)) \quad (5)$$

The checker 110 may execute the concurrent programs in a non-interleaved program execution. A non-interleaved program execution has a single thread of execution. As such, while executing thread T1, one of two possibilities occurs when spawning a new thread T2: T1 waits for T2, or T2 waits for T1. If T1 waits for T2, the spawned thread T2 executes upon being called, and T1 waits until T2 and any thread spawned by T2 completes. Additionally, while T2 is executing, any threads spawned by T2 follow this same option. If T2 waits for T1, the spawned thread T2 does not execute until T1 finishes. When T1 finishes, any of the threads spawned by it start executing.

Let $F_{seq}^P$ be a subset of $F_P$ such that $(s,t) \in F_{seq}^P$ if and only if $(s,t) \in F_P$ and there is some non-interleaved execution of P from input s that ends in state t. Interleaved bugs 104 are captured in FPseq. Accordingly, a program P has an interleaved bug if there is a pair of states $(s,t) \in F_P$ such that Failed(t) holds and for all $(s,t') \in F_{seq}^P$, Failed(t') does not hold.

Given two concurrent programs P and Q, the following statements are true. (i) If $FQ \subseteq FPseq$ and DiffError(Q,P) does not hold, then P has no interleaved bugs 104. (ii) If $FPseq \subseteq FQ$ and DiffError(Q,P) holds, then P has an interleaved bug 104.

These statements suggest that it suffices to work with under-approximations of FPseq while proving the absence of interleaved bugs 104 and over-approximations of FPseq while proving the presence of interleaved bugs 104. Under-approximate filters may be defined as programs in the cases where T1 waits for T2 or T2 waits for T1. An under-approximate filter may also be defined for all non-interleaved executions. In the case of each under-approximate filter, the filter may defined using a syntactic program transformation. The resultant filter is a sequential program.

In an embodiment where T1 waits for T2, a filter program can lead to a deterministic filter if the program does not make use of data non-determinism, or the non-determinism does not influence the assertions. Such a filter may be obtained from P simply by replacing all async calls with normal procedure calls.

In an embodiment where T2 waits for T1, a filter program may be captured as an event-driven program. It is noted that an async call, in this case, is like posting an event that is processed when a current event finishes. Such behavior is typical of event-driven programs.

Let main be the entry procedure of P. Let EventSet be a multiset of events, where each event is a function pointer along with its arguments. A set of events may be initialized in the main procedure and then execute an arbitrary event from a specified set in a loop. Events may be added to the set by executing a async statement. The following transformation is applied to each async statement: async foo(e) \(\mapsto \) EventSet.Add(new Event(foo, e))

When the concurrent program 102, P, has synchronization (e.g., thread join operations) then it is possible that AsyncAsEvents may deadlock. This may be acceptable in the system 100 because deadlocks are not considered to be bugs.

In the case of general non-interleaved executions, the filter program explores all non-interleaved executions. Such a program can have strictly more behaviors than both previous options put together. This is because it an execution is allowed to follow the first option (in the definition of non-interleaved executions) in some places and to follow the second option in other places.

Let main be the entry procedure of P. Further, let EventSet be as defined in AsyncAsEvents. Then, the AsyncGeneral filter has the same entry procedure as AsyncAsEvents. The difference is in the transformation of async statements. A Boolean variable, First, may be added to AsyncGeneral, and initialized as false. The following transformation may then be applied: async foo(e) \(\mapsto \) if(First) \{ foo(e); \} else if(nondet( )) \{First=true; foo(e); First=false; \} else \{EventSet.Add(new Event(foo, e)); \}

The variable, First, is true when a spawned thread is executed immediately. In this case, any recursively spawned thread is also executed immediately. When First is false, one option is selected non-deterministically from two options: execute the thread immediately or delay it until the current thread finishes.

Figure 4:
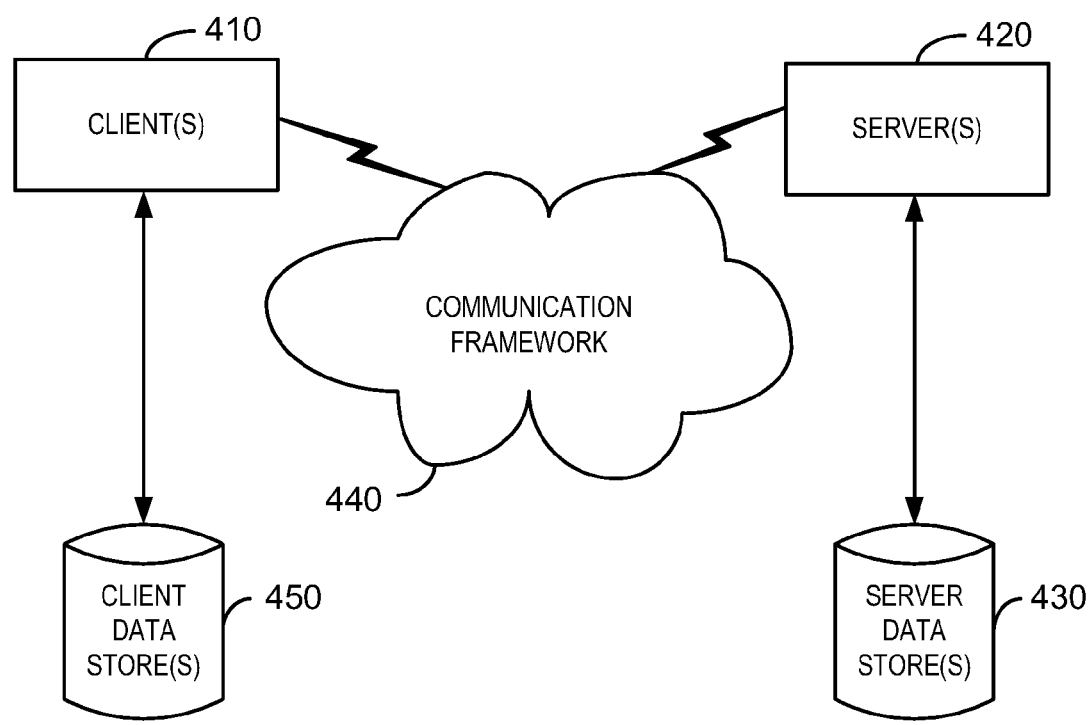
FIG. 4 is a block diagram of an exemplary networking environment for implementing various aspects of the claimed subject matter.

FIG. 4 is a block diagram of an exemplary networking environment 400 wherein aspects of the claimed subject matter can be employed. Moreover, the exemplary networking environment 400 may be used to implement a system and method that executes transactions on a distributed platform, as described herein.

The networking environment 400 includes one or more client(s) 410. The client(s) 410 can be hardware and/or software (e.g., threads, processes, computing devices). As an example, the client(s) 410 may be computers providing access to servers over a communication framework 440, such as a local area network, wide area network, or the Internet.

The environment 400 also includes one or more server(s) 420. The server(s) 420 can be hardware and/or software (e.g., threads, processes, computing devices). The server(s) 420 may be accessed by the client(s) 410.

One possible communication between a client 410 and a server 420 can be in the form of a data packet adapted to be transmitted between two or more computer processes. The environment 400 includes a communication framework 440 that can be employed to facilitate communications between the client(s) 410 and the server(s) 420.

The client(s) 410 are operably connected to one or more client data store(s) 450 that can be employed to store information local to the client(s) 410. The client data store(s) 450 may be located in the client(s) 410, or remotely, such as in a cloud server. Similarly, the server(s) 420 are operably connected to one or more server data store(s) 430 that can be employed to store information local to the servers 420.

Figure 5:
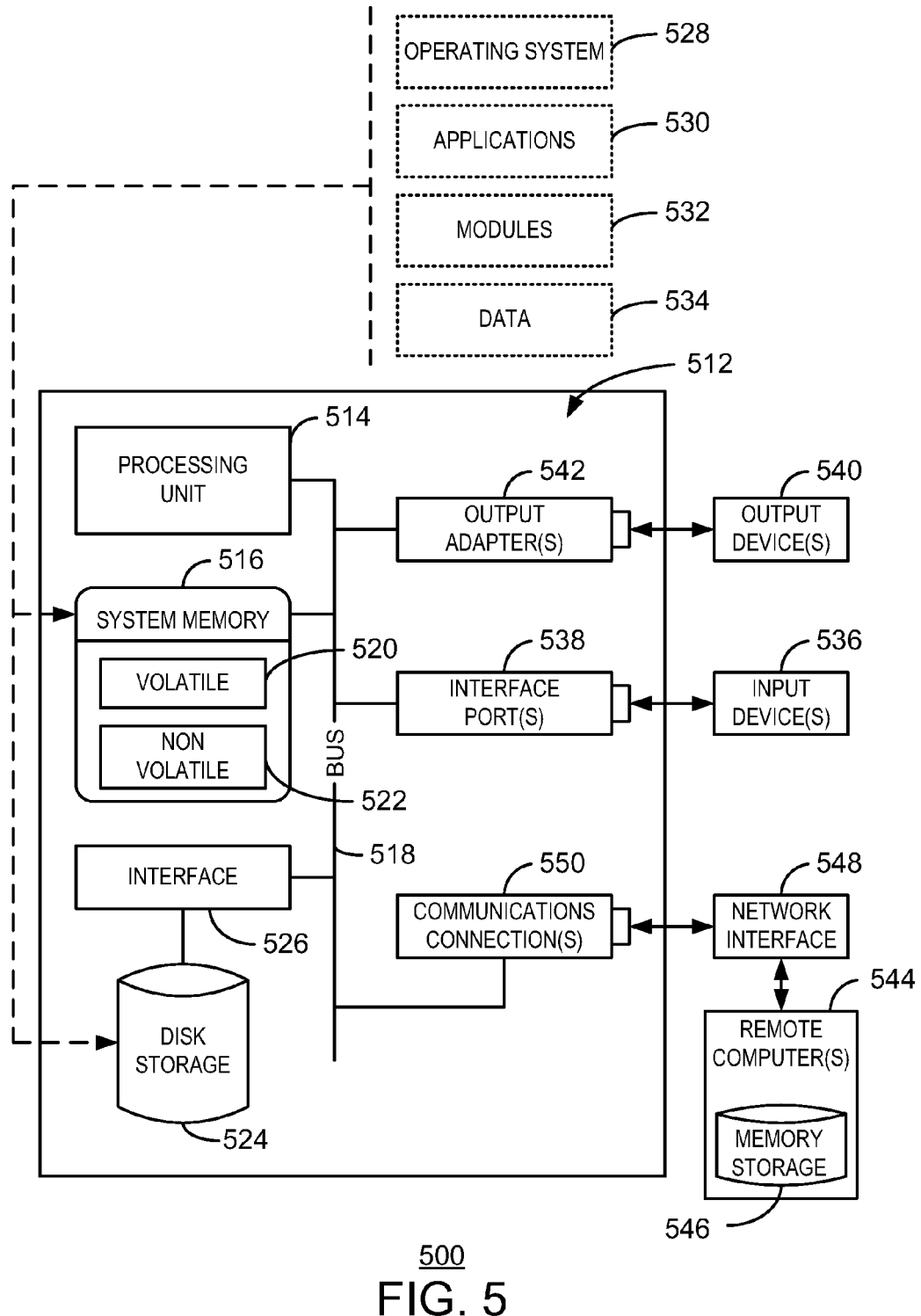
FIG. 5 is a block diagram of an exemplary operating environment for implementing various aspects of the claimed subject matter.

With reference to FIG. 5, an exemplary operating environment 500 is shown for implementing various aspects of the claimed subject matter. The exemplary operating environment 500 includes a computer 512. The computer 512 includes a processing unit 514, a system memory 516, and a system bus 518.

The system bus 518 couples system components including, but not limited to, the system memory 516 to the processing unit 514. The processing unit 514 can be any of various available processors. Dual microprocessors and other multi-processor architectures also can be employed as the processing unit 514.

The system bus 518 can be any of several types of bus structure(s) including the memory bus or memory controller, a peripheral bus or external bus, and/or a local bus using any variety of available bus architectures known to those of ordinary skill in the art. The system memory 516 comprises non-transitory computer-readable storage media that includes volatile memory 520 and nonvolatile memory 522.

The basic input/output system (BIOS), containing the basic routines to transfer information between elements within the computer 512, such as during start-up, is stored in nonvolatile memory 522. By way of illustration, and not limitation, nonvolatile memory 522 can include read only memory (ROM), programmable ROM (PROM), electrically programmable ROM (EPROM), electrically erasable programmable ROM (EEPROM), or flash memory.

Volatile memory 520 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 512 also includes other non-transitory computer-readable media, such as removable/non-removable, volatile/non-volatile computer storage media. FIG. 5 shows, for example a disk storage 524. Disk storage 524 includes, but is not limited to, devices like a magnetic disk drive, floppy disk drive, tape drive, Jaz drive, Zip drive, LS-100 drive, flash memory card, or memory stick.

In addition, disk storage 524 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 524 to the system bus 518, a removable or non-removable interface is typically used such as interface 526.

It is to be appreciated that FIG. 5 describes software that acts as an intermediary between users and the basic computer resources described in the suitable operating environment 500. Such software includes an operating system 528. Operating system 528, which can be stored on disk storage 524, acts to control and allocate resources of the computer system 512.

System applications 530 take advantage of the management of resources by the operating system 528 through program modules 532 and program data 534 stored either in system memory 516 or on disk storage 524. It is to be appreciated that the claimed subject matter can be implemented with various operating systems or combinations of operating systems.

A user enters commands or information into the computer 512 through input device(s) 536. Input devices 536 include, but are not limited to, a pointing device (such as a mouse, trackball, stylus, or the like), a keyboard, a microphone, a joystick, a satellite dish, a scanner, a TV tuner card, a digital camera, a digital video camera, a web camera, and/or the like. The input devices 536 connect to the processing unit 514 through the system bus 518 via interface port(s) 538. Interface port(s) 538 include, for example, a serial port, a parallel port, a game port, and a universal serial bus (USB).

Output device(s) 540 use some of the same type of ports as input device(s) 536. Thus, for example, a USB port may be used to provide input to the computer 512, and to output information from computer 512 to an output device 540.

Output adapter 542 is provided to illustrate that there are some output devices 540 like monitors, speakers, and printers, among other output devices 540, which are accessible via adapters. The output adapters 542 include, by way of illustration and not limitation, video and sound cards that provide a means of connection between the output device 540 and the system bus 518. It can be noted that other devices and/or systems of devices provide both input and output capabilities such as remote computer(s) 544.

The computer 512 can be a server hosting various software applications in a networked environment using logical connections to one or more remote computers, such as remote computer(s) 544. The remote computer(s) 544 may be client systems configured with web browsers, PC applications, mobile phone applications, and the like.

The remote computer(s) 544 can be a personal computer, a server, a router, a network PC, a workstation, a microprocessor based appliance, a mobile phone, a peer device or other common network node and the like, and typically includes many or all of the elements described relative to the computer 512.

For purposes of brevity, only a memory storage device 546 is illustrated with remote computer(s) 544. Remote computer(s) 544 is logically connected to the computer 512 through a network interface 548 and then connected via a wireless communication connection 550.

Network interface 548 encompasses wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 550 refers to the hardware/software employed to connect the network interface 548 to the bus 518. While communication connection 550 is shown for illustrative clarity inside computer 512, it can also be external to the computer 512. The hardware/software for connection to the network interface 548 may include, for exemplary purposes only, internal and external technologies such as, mobile phone switches, modems including regular telephone grade modems, cable modems and DSL modems, ISDN adapters, and Ethernet cards.

An exemplary processing unit 514 for the server may be a computing cluster comprising Intel® Xeon CPUs. The disk storage 524 may comprise an enterprise data storage system, for example, holding thousands of impressions.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and/or events of the various methods of the claimed subject matter.

There are multiple ways of implementing the subject innovation, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the subject innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A method for reducing false alarms in a static analysis of first and second concurrent programs, comprising:
    determining that a static analysis of the first concurrent program generates a warning for an input;
    determining whether a static analysis of the second concurrent program generates the warning for the input; and
    removing the warning if the static analysis of the second concurrent program generates the warning.

2. The method recited in claim 1, wherein the static analysis of the concurrent programs comprises static assertion checking.

3. The method recited in claim 1, comprising reporting a warning for an interleaved bug to a user.

4. The method recited in claim 3, wherein the interleaved bug comprises a warning generated by a static analysis of the first concurrent program, wherein the warning is not generated by a static analysis of the second concurrent program.

5. The method recited in claim 4, comprising determining that a static analysis of the second concurrent program does not generate the warning for the input.

6. The method recited in claim 1, comprising reporting a warning for an input if there exists a non-deterministic choice in the first concurrent program that causes a warning and no non-deterministic choices in the second concurrent program cause a warning.

7. The method recited in claim 1, wherein the second concurrent program comprises the first concurrent program, and wherein the second concurrent program is constrained to execute sequentially on a single thread.

8. The method recited in claim 7, wherein a warning generated by a static assertion checking of the first concurrent program is flagged as an interleaved bug if the warning is not generated by a static assertion checking of the second concurrent program.

9. The method recited in claim 1, wherein the first concurrent program and the second concurrent program comprise non-deterministic programs.

10. A system for performing a static assertion checking process, comprising:
    a processing unit; and
    a system memory comprising code configured to direct the processing unit to:
        determine that a static analysis of a first concurrent program generates a warning for an input, wherein the first concurrent program comprises a first non-deterministic program;
        determine whether a static analysis of a second concurrent program generates the warning for the input, wherein the second concurrent program comprises a second non-deterministic program, and wherein the second concurrent program is executed sequentially; and
        remove the warning if the static analysis of the second concurrent program generates the warning.

11. The system recited in claim 10, wherein the static analysis comprise static assertion checking.

12. The system recited in claim 10, wherein the system memory comprises code configured to direct the processing unit to report a warning for an interleaved bug to a user.

13. The system recited in claim 12, wherein the interleaved bug comprises a warning generated by a static analysis of the first concurrent program, wherein the warning is not generated by a static analysis of the second concurrent program.

14. The system recited in claim 13, wherein the system memory comprises cod configured to direct the processing unit to determine that a static analysis of the second concurrent program does not generate the warning for the input.

15. The system recited in claim 10, wherein the system memory comprises code configured to direct the processing unit to report a warning for an input if there exists a non-deterministic choice in the first concurrent program that causes a warning and no non-deterministic choices in the second concurrent program that cause a warning.

16. The system recited in claim 10, wherein the second concurrent program comprises the first concurrent program, and wherein the second concurrent program is constrained to execute sequentially on a single thread.

17. The system recited in claim 10, wherein a warning generated by a static assertion checking of the first concurrent program is flagged as an interleaved bug if the warning is not generated by a static assertion checking of the second concurrent program.

18. One or more computer-readable storage media, comprising code configured to direct a processing unit to:

determine that a static assertion checking of a first concurrent program generates a warning for an input, wherein the first concurrent program comprises a first non-deterministic program;

determine whether a static assertion checking of a second concurrent program generates the warning for the input, wherein the second concurrent program comprises a second non-deterministic program, and wherein the second concurrent program is executed sequentially;

remove the warning if the static analysis of the second concurrent program generates the warning; and reporting a warning for an interleaved bug to a user if the static analysis of the second concurrent program does not generate the warning.

19. The computer-readable storage media recited in claim 18, comprising code configured to report a warning for an input if there exists a non-deterministic choice in the second concurrent program that causes a warning and no non-deterministic choices in the first concurrent program generates a warning.

20. The computer-readable storage media recited in claim 18, wherein the second concurrent program comprises the first concurrent program, and wherein the second concurrent program is constrained to execute sequentially on a single thread.

* * * * *